United States Patent
Costache et al.

(10) Patent No.: US 9,046,704 B2
(45) Date of Patent: Jun. 2, 2015

(54) APPARATUS AND METHOD FOR GUIDING OPTICAL WAVES

(75) Inventors: Florenta Costache, Dresden (DE); Martin Blasl, Dresden (DE); Harald Schenk, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 455 days.

(21) Appl. No.: 13/569,911

(22) Filed: Aug. 8, 2012

(65) Prior Publication Data

US 2013/0034323 A1 Feb. 7, 2013

Related U.S. Application Data

(63) Continuation of application No. PCT/EP2010/051722, filed on Feb. 11, 2010.

(51) Int. Cl.
*G02F 1/295* (2006.01)
*G02F 1/035* (2006.01)
*G02F 1/313* (2006.01)
*G02F 1/03* (2006.01)

(52) U.S. Cl.
CPC .............. *G02F 1/035* (2013.01); *G02F 1/0316* (2013.01); *G02F 1/313* (2013.01); *G02F 2201/122* (2013.01)

(58) Field of Classification Search
USPC ............................................................. 385/8
See application file for complete search history.

(56) References Cited

U.S. PATENT DOCUMENTS

| | | | |
|---|---|---|---|
| 3,695,745 A | 10/1972 | Furukawa | |
| 5,664,032 A * | 9/1997 | Bischel et al. | 385/4 |
| 6,353,690 B1 * | 3/2002 | Kulishov | 385/10 |
| 6,646,776 B1 | 11/2003 | Cheung et al. | |
| 7,035,490 B2 * | 4/2006 | Miyazaki et al. | 385/10 |
| 2004/0213499 A1 | 10/2004 | Miyazaki et al. | |
| 2004/0247236 A1 | 12/2004 | Yoshimura et al. | |

FOREIGN PATENT DOCUMENTS

EP 0241967 10/1987
WO WO 91/13375 9/1991

* cited by examiner

*Primary Examiner* — Sung Pak
(74) *Attorney, Agent, or Firm* — Michael A. Glenn; Perkins Coie LLP

(57) ABSTRACT

Provided is a concept for variably guiding optical waves by using a layer-stack having an electro-optic core layer of electro-optic material for guiding light and an electrode arrangement with at least a first electrode layer in proximity to the electro-optic core layer, wherein the electrode arrangement is configured to activate an electro-optic effect in a region of the electro-optic core layer by an electric field generated by means of the electrode arrangement, such that a propagation of the light is manipulated in the region of the activated electro-optic effect.

13 Claims, 11 Drawing Sheets

▨ voltage OFF
☐ voltage ON voltage OFF (or ON)
voltage ON (or OFF)

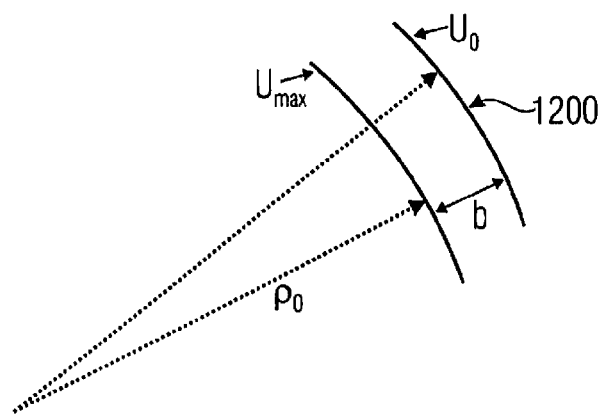
FIG 12A
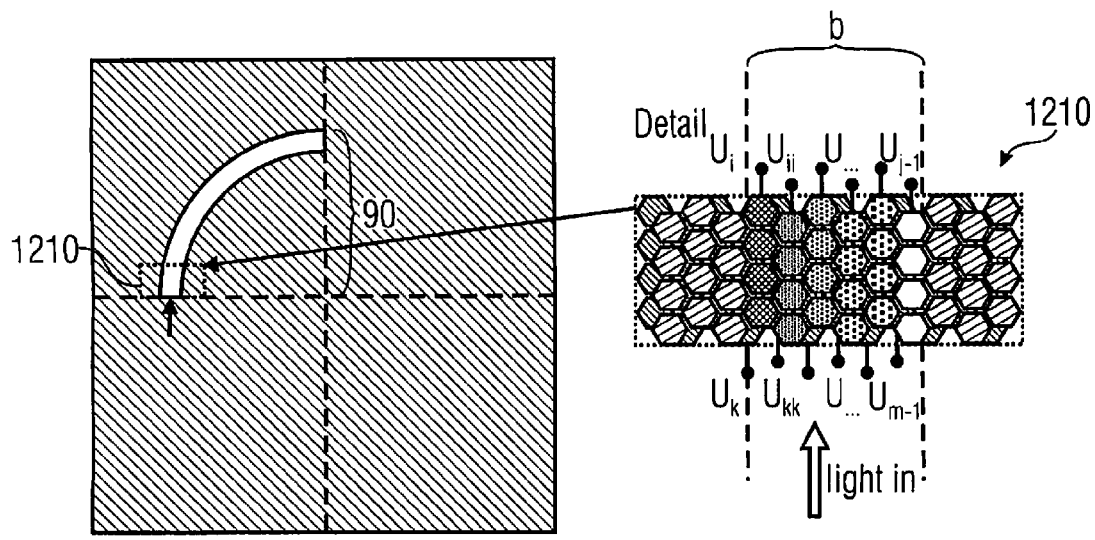
◈ voltage OFF (or ON)
◉ voltage ON (or OFF)
FIG 12B
FIG 12C

APPARATUS AND METHOD FOR GUIDING OPTICAL WAVES

CROSS-REFERENCE TO RELATED APPLICATIONS

This application is a continuation of copending International Application No. PCT/EP2010/051722, filed Feb. 11, 2010, which is incorporated herein by reference in its entirety.

BACKGROUND OF THE INVENTION

The present invention generally relates to optical communication devices and, in particular, to variably configurable optical waveguide devices (VOWD).

Optical telecommunication networks over large distances include a wide variety of devices for routing, splitting, interconnecting, modulating and amplifying electromagnetic radiation at optical frequencies, i.e. light. Planar devices such as connectors, switches, power attenuators, beam steerers, directional couplers and intensity modulators, etc., incorporate passive and/or active optical waveguides as basic transport means for an encoded light wave.

There are a variety of passive and (electro-optically) active waveguide structures. Waveguides used at optical frequencies are typically dielectric waveguides, structures in which a dielectric material with high relative permeability $\mu_r$, and thus high index of refraction n, is surrounded by a material with lower relative permeability $\mu_r$, i.e. lower index of refraction n. The refractive index or index of refraction $$n = \sqrt{\epsilon_r \mu_r} \quad (1)$$

of a medium is a measure of how much the speed of light is reduced inside the medium, wherein $\epsilon_r$ is the medium's relative permittivity, and $\mu_r$ is its relative permeability.

A waveguide structure guides optical waves by total internal reflection. The most common optical waveguide is optical fiber. However, other types of optical waveguides may also be used, including, e.g., photonic-crystal fibers, which guide waves by any of several distinct mechanisms. The common principle of the different types of optical waveguides is to induce a higher refractive index n in a certain material region (called core layer or region in the sequel) which, when embedded in a region of lower refractive index (called buffer or cladding region in the sequel), acquires waveguiding properties. A refractive index difference and a geometry of a region with different refractive indexes determine the propagation properties of the optical guided wave. For waveguide structures induced in electro-optic materials, the refractive index difference is induced by locally changing an applied electric field according to an electro-optic effect.

The electro-optic effect is a change in the optical properties of a material in response to an electric field that varies slowly compared to the frequency of light. The term electro-optic effect encompasses a number of distinct phenomena, which may be subdivided into change of absorption and/or change of the refractive index. For designing electro-optic optical waveguides the change of the refractive index is of particular interest. This change of the refractive index may be due to the so-called Pockels effect (or linear electro-optic effect) or the so-called Kerr effect (or quadratic electro-optic effect). The Pockels effect describes a change in the refractive index linearly proportional to the applied electric field. The Kerr effect describes a change in the refractive index proportional to the square of the electric field. Whereas only certain crystalline solids show the Pockels effect, all materials display the Kerr effect, with varying magnitudes, but it is generally much weaker than the Pockels effect.

Electro-optic waveguides may be made from inorganic and/or organic materials, such as, e.g., lithium niobate, barium titanate, gallium arsenide, various oxides and ceramics. Alternatively, electro-optic polymer based waveguide devices can provide cost-effective and high performance devices considering their small velocity mismatch, low optical loss and the possibility of operation at high speed. Further, there are various blends and composites of organic and/or inorganic materials, known by the skilled person, which are used in existing devices or are still in research for waveguide devices.

Generally, waveguide structures are fabricated by methods such as coating methods in interplay with patterning methods, such as photolithography (photochemical structuring), mechanical structuring via hot embossing, replication and other imprint methods, diffusion as well as implantation of molecules, atoms or ions, UV-reactive processes, whereas a refractive index variation of polymers may be induced by varying the irradiation time and intensity.

A drawback of conventional waveguide devices and methods for their fabrication is that once the waveguide materials are structured, their geometry cannot be changed anymore.

SUMMARY

According to an embodiment, an optical waveguide device may have a layer-stack which may have an electro-optic core layer of electro-optic material for guiding light; and an electrode arrangement with at least a first electrode layer in proximity to the electro-optic core layer, wherein the electrode arrangement is configured to activate an electro-optic effect in a region of the electro-optic core layer by an electric field generated by means of the electrode arrangement, such that a propagation of the light is manipulated in the region of the activated electro-optic effect, wherein the first electrode layer has a regular two-dimensional array of planar arranged and individually addressable first electrodes to activate the electro-optic effect in the region of the electro-optic core layer by an electric field generated by individually applying electric potentials to addressed first electrodes, and wherein the electrode arrangement has, arranged in proximity and on a same side of the electro-optic core layer as the first electrode layer, a further electrode layer in parallel to the first electrode layer, the further electrode layer having a plurality of individually addressable further electrodes, arranged such that a position of a further electrode laterally intermediates positions of two neighbouring first electrodes in order to minimize electrical field inhomogeneities due to lateral electrode separation, wherein the region, in which the electro-optic effect is activated, represents an optical pathway permitting propagation of light such that the shape of the optical pathway is determined by the pattern of addressed electrodes.

According to another embodiment, a method for variably guiding optical waves may have the steps of activating an electro-optic effect in a region of an electro-optic core layer of electro-optic material by an electric field generated by means of an electrode arrangement with at least a first electrode layer in proximity to the electro-optic core layer, such that a propagation of the light is manipulated in the region of the activated electro-optic effect, wherein the first electrode layer has a regular two-dimensional array of planar arranged and individually addressable first electrodes to activate the electro-optic effect in the region of the electro-optic core layer by an electric field generated by individually applying electric potentials to addressed first electrodes, and wherein the electrode arrangement has, arranged in proximity and on a same side of the electro-optic core layer as the first electrode layer, a further electrode layer in parallel to the first electrode layer, the further electrode layer having a plurality of individually addressable further electrodes, arranged such that a position of a further electrode laterally intermediates positions of two neighbouring first electrodes in order to minimize electrical field inhomogeneities due to lateral electrode separation, wherein the region, in which the electro-optic effect is activated, represents an optical pathway permitting propagation of light such that the shape of the optical pathway is determined by the pattern of addressed electrodes.

It is the finding of the present invention that a waveguide geometry or an optical pathway may be varied by using a layer stack of planar arranged electro-optically active materials and an electrode arrangement with at least one electrode layer in proximity to the electro-optically active layer stack. By freely programming or selecting individual electrodes of the electrode arrangement it is possible to generate various waveguide structures or optical pathways by selecting corresponding electrode pathways.

Embodiments of the present invention provide an optical waveguide device, wherein the waveguide device comprises a layer stack, the layer stack comprising an electro-optic core layer of electro-optic material for guiding light and an electrode arrangement with at least a first electrode layer in proximity to the electro-optic core layer, wherein the electrode arrangement is configured to activate an electro-optic effect in a region of the electro-optic core layer by an electric field generated by means of the electrode arrangement, such that a propagation of light is manipulated in the region of the activated electro-optic effect.

According to embodiments of the present invention, the electro-optic material of the electro-optic core layer is configured to change its refractive index in response to the electric field generated by means of electrodes of the electrode arrangement, such that activating the electro-optic effect in the region of the electro-optic core layer comprises changing the refractive index of electro-optic material in said region.

The electro-optic core layer is a layer of an electro-optically active material from the class of polymers, copolymers, host-guest systems, such as chromophores mixed in polymer matrixes, chromophores, side-chain polymers or organically modified sol-gel, liquid crystals, liquid crystals dispersed in polymer matrix, opto-ceramics, silicon based polymers, any inorganic material, such as nonlinear crystals (lithium niobate), gallium arsenide, such as $TiO_2$ (Titanium Dioxide), ceramics such as PLZT (Lead-Lanthanum-Zirconate-Titanate), PMN-PT (Lead Magnesium Niobate-Lead Titanate) or any mixture of organic/inorganic/ceramics or ceramic composites. Buffer or cladding layers may be made of passive materials or electro-optic materials. These classes of materials are known by the skilled person.

According to embodiments, the first electrode layer comprises a plurality of planar arranged and individually addressable first electrodes to selectively activate the electro-optic effect in a desired region of the electro-optic core layer by an electric field generated by means of individually addressed first electrodes. According to embodiments, the plurality of electrodes is to be understood as more than two electrodes, advantageously more than ten electrodes, and even more advantageously, more than 100 electrodes.

According to some embodiments the electrode arrangement comprises, arranged in proximity and on an opposite side of the electro-optic core layer compared to the first electrode layer, a second electrode layer comprising at least one second electrode, such that the electro-optic core layer is arranged in between the first and the second electrode layer. The electro-optic effect is selectively activated by applying electric potential differences to adjacent individually addressable first electrodes of the first electrode layer, or by applying electric potential differences between opposite individually addressable electrodes of the first electrode layer and the second electrode layer.

To keep light in the electro-optic core layer by total internal reflection, the layer stack comprises, according to some embodiments, at least a first buffer or cladding layer, which is arranged in between the electro-optic core layer and the first electrode layer. Thereby, the first cladding layer is formed from a material having a refractive index being equal to or lower than a refractive index of the electro-optic core layer.

According to a further embodiment, the layer stack comprises a second buffer or cladding layer arranged on an opposite side of the electro-optic core layer compared to the first cladding layer, such that the electro-optic core layer is arranged in between the first and the second cladding layer. If there is a second electrode layer arranged on the opposite side of the electro-optic core layer compared to the first electrode layer, the second buffer or cladding layer is arranged in between the electro-optic core layer and the second electrode layer. Also, the second cladding layer is formed from a material having a refractive index being equal to or lower than the refractive index of the electro-optic core layer.

Hence, by using embodiments of the present invention, it is possible to design a variable or variably configurable planar electro-optic waveguide device that comprises a multi-layer system having a core layer of electro-optic material and a passive or an electro-optic cladding layer, wherein the refractive index of the cladding is lower than or equal to the refractive index of the core layer for confining light in the core layer by total reflection. The electro-optic effect is activated in a region of the core layer by applying a corresponding electric field across it, i.e., applying corresponding electric potentials on electrodes of electrode layers placed in the proximity of the multi-layer system. At least one of the electrode layers, macroscopic in size, is patterned such that a plurality of closely packed, identically shaped individual flat sub-electrodes, microscopic in size, is formed. Thereby, the sub-electrodes are arranged in one- or two-dimensional arrays and are placed in a same plane. The microscopic sub-electrodes will also be referred to as "pixel electrodes" on a "pixelized planar surface" in the sequel of this specification. This pixelized planar surface of the electrode layer may be placed on a substrate made of, e.g., silicon or glass. The pixel electrodes may be contacted separately via the substrate by any known means, such that they are individually addressable. This may be achieved by integrating the pixel electrodes in an active matrix, e.g., a SRAM-like architecture or, passively, i.e., one electrical connection per pixel electrode to a driver electronics. A geometrical shape of the pixel electrodes and/or a distance between them is advantageously chosen so that to assure a maximum surface coverage and to best fit the shape of any waveguide device or any combination of various waveguide devices.

Thus, by operation of certain pixel electrodes at appropriate voltages, the light propagating through the electro-optic core may be guided, split, modulated or amplified on various corresponding pathways along the electro-optic core layer of the electro-optic waveguide device. A multilayer system according to an embodiment may be sandwiched between electrode layers, whereas at least one of the electrode layers is a pixelized electrode layer. According to further embodiments, the other electrode layer may either be missing or it may be made of a continuous layer made of a conductive material, such as, e.g., Al, ITO (Indium Tin Oxide), conductive polymer, etc., or may be patterned, similar to the first electrode layer, in individually addressable pixel-electrodes.

Embodiments of the present invention include variable electro-optic waveguide devices which may be designed for functioning as, e.g., splitters, beam steerers, tunable resonators, filters, switches, beam deflectors, polarization sensitive waveguide devices, variable optical waveguide attenuators or any other planar electro-optic waveguide device, as well as prisms, lenses, gratings, etc. In any case, particular specifications of the inventive waveguide structure may be continuously adjusted by addressing the electrodes of the electrode arrangement correspondingly.

BRIEF DESCRIPTION OF THE DRAWINGS

Embodiments of the present invention will be detailed in the following with reference to the accompanying drawings, in which:

FIG. 12a-c illustrate a concept of obtaining small deflection radii with an optical waveguide according to an embodiment of the present invention.

DETAILED DESCRIPTION OF THE INVENTION

In optical communication systems fast modulation and switching of optical signals as well as sub-nanosecond switching times are important functions. One effect that can be exploited successfully to obtain such functionalities is the electro-optic (EO) effect, which occurs in some materials. The electro-optic effect is a change in the optical properties of a material in response to an electric field. In an uniaxial (i.e., if the material has a single axis of anisotropy or optical axis) birefringent (i.e., decomposition of a ray of light into two rays, the ordinary ray and the extraordinary ray, when it passes through certain types of material) electro-optic material a refractive index change induced by a modulating external electric field is given by:

$$\Delta n = \tfrac{1}{2} n_0^3 rE + \tfrac{1}{2} n_0^3 RE^2 + \ldots, \qquad (2)$$

wherein the first term $\tfrac{1}{2}n_0^3 rE$ of the right side describes the so-called Pockels effect or linear electro-optic effect, which occurs in some non-centrosymmetric materials, while the second term $\tfrac{1}{2}n_0^3 RE^2$ of the right side describes the so-called Kerr effect or quadratic electro-optic effect.

As, in fact, it generates a change in refractive index, the electro-optic effect is used to induce active optical waveguides in certain materials. Active optical waveguides are the basic structures for light transport in a multitude of active planar devices. Embodiments of the present invention relate to a realization of an electro-optic active waveguide structure device which may replace multiple existing planar waveguide devices.

Figure 1A:
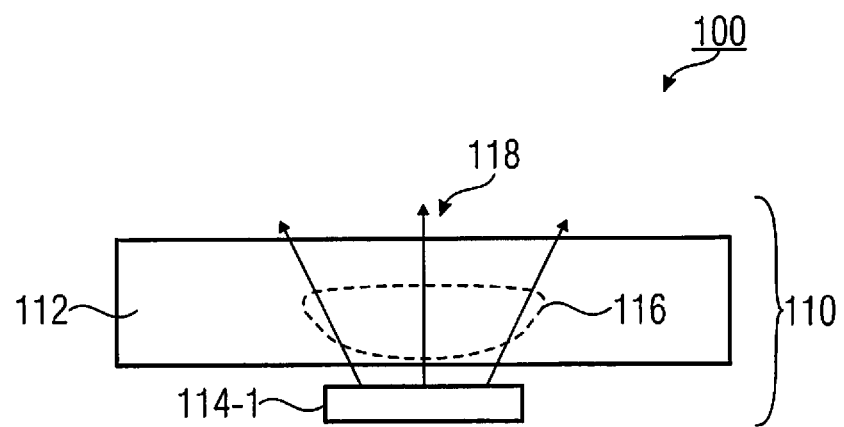
FIGS. 1a,b show optical waveguide device concepts according to embodiments of the present invention.
Figure 1B:
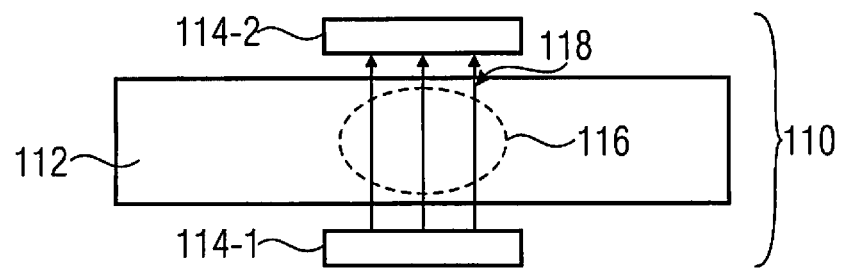

An optical waveguide device according to an embodiment of the present invention is schematically shown in FIGS. 1a, 1b.

FIG. 1a illustrates the optical waveguide device 100 comprising a layer stack 110, wherein the layer stack comprises an electro-optic core layer 112 of electro-optic material for guiding light. Further, the layer stack 110 comprises an electrode arrangement in at least one electrode layer 114-1 in proximity to the electro-optic core layer 112, wherein the electrode arrangement is configured to activate an electro-optic effect in a region 116 of the electro-optic core layer 112 by an electric field 118 generated by means of the electrode arrangement, such that a refractive index of the electro-optic material is manipulated in the region 116 of the activated electro-optic effect.

In a further embodiment, which is presented in FIG. 1b, the layer stack comprises the electrode layer 114-1 in proximity to the electro-optic core layer 112 and a counter electrode layer 114-2 arranged on opposite side of the electro-optic core layer 112, wherein the electrode arrangement 114-1, 114-2 is again configured to activate an electro-optic effect in the region 116 of the electro-optic core layer 112 by an electric field 118 generated by means of the electrode arrangement.

A thickness of the electro-optic core layer 112 is in the range of $10^{-7}$ m to $10^{-4}$ m, as well as a distance of the at least one electrode layer 114-1, 114-2 to the electro-optic core layer 112, which may also be in the range of $10^{-7}$ m to $10^{-4}$ m, according to embodiments.

Figure 2A:
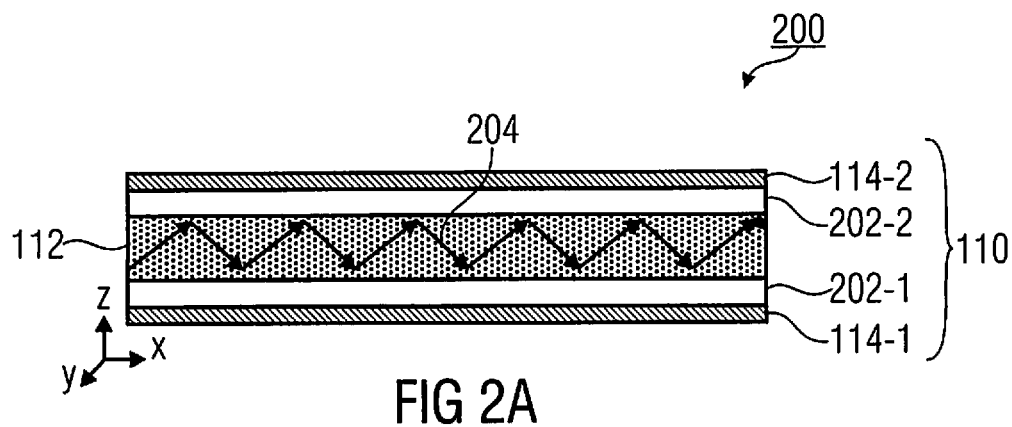
FIG. 2a shows a cross-sectional view of an optical waveguide device according to a further embodiment of the present invention.

The concept of the present invention shall now be described in more detail with reference to FIGS. 2a-2c. FIG. 2a shows a cross-sectional view of a waveguide device 200 according to a further embodiment of the present invention.

The waveguide device 200 comprises a layer stack 110, wherein the layer stack 110 comprises the electro-optic core layer 112 embedded in between first and second buffer or cladding layers 202-1, 202-2. In addition, the sandwich of the electro-optic core layer 112 and the cladding layers 202 is embedded in between a lower electrode layer 114-1 and an upper electrode layer 114-2. The lower electrode layer 114-1 comprises an array of planar arranged and individually addressable electrodes. The upper electrode layer 114-2 comprises at least one electrode arranged on an opposite side of the electro-optic core layer 112 compared to the lower electrode layer 114-1. Hence, the electro-optic core layer 112 is, as well as the first and second cladding layers 202-1, 202-2, arranged in between the first and the second electrode layer 114-1, 114-2. Eventually additionally applied adhesive, protection and passivation layers are not shown here. The electro-optic effect may be activated in a region 116 of the electro-optic core layer 112 in response to an electric field generated by means of the electrode arrangement comprising the lower and upper electrode layers 114-1, 114-2, such that a refractive index of the electro-optic material and, in return, a propagation of light 204 may be manipulated along the region of the activated electro-optic effect.

The electro-optic waveguide device 200 is activated by applying a corresponding electric field across it, i.e., between the outermost placed lower and upper electrode layer 114-1, 114-2. As mentioned before, at least one of the electrode layers 114-1 or 114-2 is composed of a plurality of closely packed, identically shaped, planar pixel electrodes. This will be explained with reference to FIG. 2b.

Figure 2B:
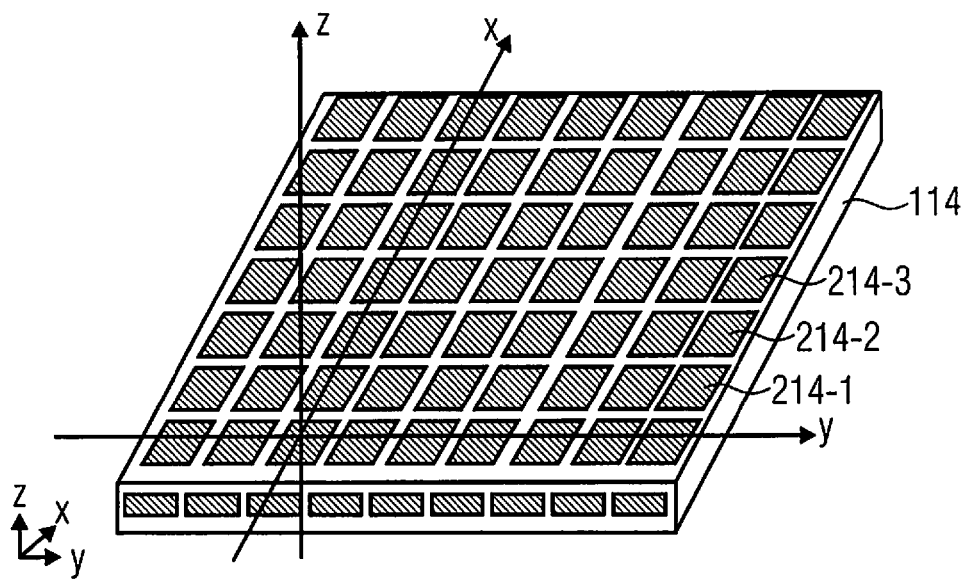
FIG. 2b shows a top view section of a patterned electrode layer according to an embodiment of the present invention.

FIG. 2b illustrates a top view of a planar electrode layer 114 (xy-plane), which may either be the upper or lower electrode layer 114-1, 114-2, revealing a patterned layer or plane in form of a plurality of identical planar arranged sub- or pixel-electrodes 214. Hence, at least one of the electrode layers 114-1, 114-2 comprises an array of planar arranged and individually addressable pixel electrodes 214-$n$ (n=1,2,3, ..., N; N>2), such that the electro-optic effect may be activated in a region of the electro-optic core layer 112 in response to an electric field generated by means of individually addressed pixel electrodes 214-$n$ (n=1,2,3, ..., N), such that a refractive index of the electro-optic material and, in return, a propagation of light may be selectively or variably manipulated along the region 116 of the activated electro-optic effect. Thereby, the region or the optical pathway 116 corresponds to selected, i.e., activated, pixels or pixel electrodes 214-$n$ of the planar pixel electrode array 114-1 or 114-2. As will be seen, a pixel may be either defined by adjacent pixel electrodes from one side of the electro-optic core layer 112 or by opposing pixel electrodes pairs from different, i.e., opposite sides of the electro-optic core layer 112.

Figure 2C:
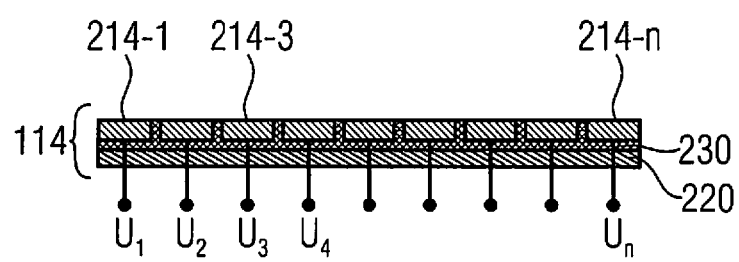
FIG. 2c shows a cross-sectional view of the electrode layer according to FIG. 2b.

A cross-sectional view of the electrode layer 114 according to FIG. 2b is presented in FIG. 2c.

The individual pixel-electrodes 214-$n$ (n=1,2,3, ..., N), which may be fabricated by means of a conventional CMOS-process, are contacted individually via a substrate 220 to electronics (not shown) of the optical waveguide device 200, which may comprise an address logic circuit for individually addressing the pixel-electrodes 214-$n$ (n=1,2,3, ..., N) of at least one of the electrode layers 114 in order to apply a configurable electrical voltage or potential $U_n$ (n=1,2,3, ..., N) to an individually addressed electrode. An electrical path configuration of a desired optical waveguide pathway may be programmed by adjusting the voltages $U_n$ (n=1,2,3, ..., N) applied to the pixel electrodes 214-$n$ (n=1,2,3, ..., N) corresponding to the desired optical path through the electro-optic core layer 112. Applying a certain voltage $U_n$ (n=1,2,3, ..., N) on corresponding pixel electrodes 214-$n$ (n=1,2,3, ..., N), the waveguide pathways may be varied, for instance, from a straight waveguide connection to a deflection to a certain angle, which will be explained further below. As a consequence, various planar waveguide based devices may be realized according to the present invention, such as optical switches, beam steering, optical couplers, etc. This is exemplarily indicated by FIGS. 3a to 3d.

The white regions in FIGS. 3a-3d correspond to pixels or corresponding pixel electrodes 214-$n$ (n=1,2,3, ..., N) to which a certain voltage $U_n$ (n=1,2,3, ..., N) is applied, hence, resulting in the activation of the electro-optic effect in the corresponding (white) region of the electro-optic core layer 112. I.e., the white regions in FIGS. 3a-d may also be regarded as the regions in the electro-optic core layer 112 in which the electro-optic effect has been activated due to an electric field emerging from the addressed or driven pixel-electrodes 214-$n$ (n=1,2,3, ..., N). As indicated by FIGS. 3a-d, the white areas or regions correspond to regions through which light may travel or propagate due to the activated electro-optic effect. The black regions, in contrast, correspond to regions in which the electro-optic effect has not been activated and, hence, a propagation of light is not possible.

Figure 3A:
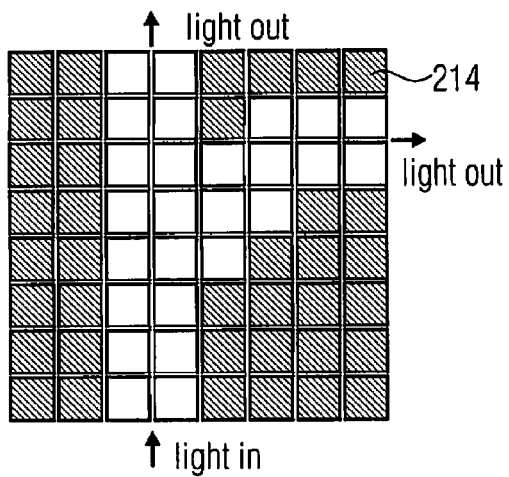
FIG. 3a shows a top view section of a planar electrode arrangement patterned in arrays of identically shaped pixel electrodes, wherein the geometrical shape of the pixel electrodes is squared.
Figure 3B:
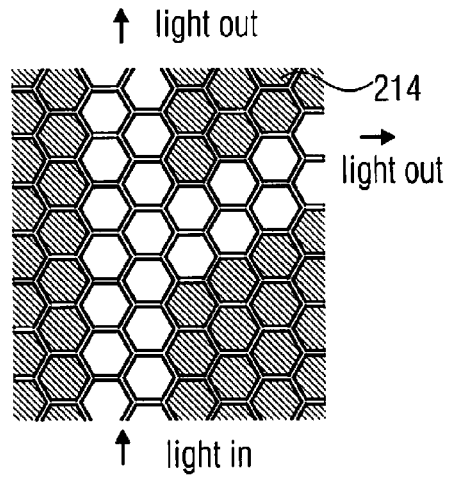
FIG. 3b shows a top view section of a planar electrode arrangement patterned in arrays of identically shaped pixel electrodes, wherein the geometrical shape of the pixel electrodes is hexagonal.
Figure 3C:
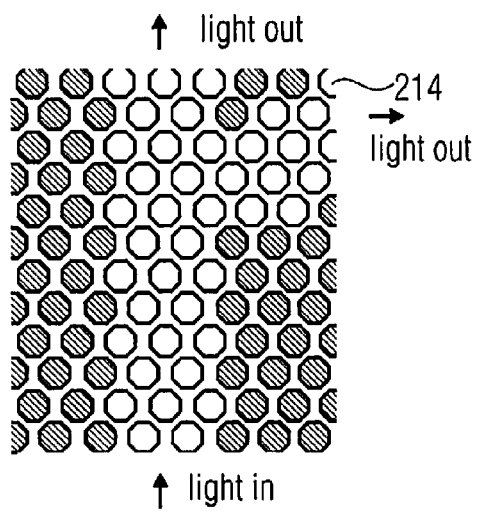
FIG. 3c shows a top view section of a planar electrode arrangement patterned in arrays of identically shaped pixel electrodes, wherein the geometrical shape of the pixel electrodes is octagonal.
Figure 3D:
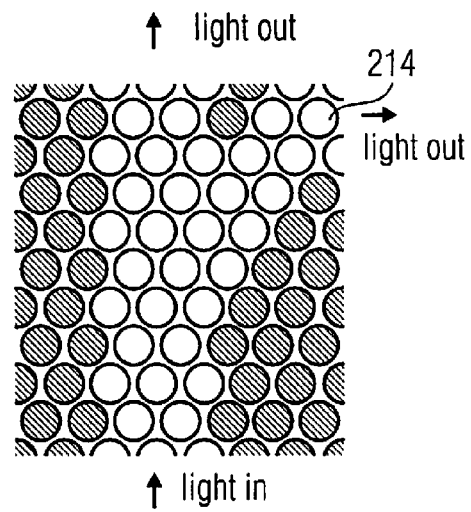
FIG. 3d shows a top view section of a planar electrode arrangement patterned in arrays of identically shaped pixel electrodes, wherein the geometrical shape of the pixel electrodes is circular.

The geometrical shape of the individually addressable pixel-electrodes 214-$n$ (n=1,2,3, ..., N) as well as spaces in between adjacent pixel electrodes 214-$n$ should allow for a maximum surface coverage in order to minimize possible electric fields inhomogeneities in the proximity to the pixel electrodes 214-$n$, which may alter a modal structure of the variable waveguide 100, 200 and give rise to extra losses. Therefore, the pixel-electrodes 214-$n$ may have different geometrical shapes as it is exemplarily shown in FIGS. 3a-d. FIG. 3a shows squared pixel-electrodes 214-$n$, whereas FIG. 3b shows hexagonal pixel-electrodes 214-$n$. FIG. 3c illustrates octagonal pixel-electrodes 214-$n$, whereas FIG. 3b depicts circular pixel-electrodes 214-$n$. Of course, the illustrated geometrical shapes are only exemplary, and it shall be emphasized that many other geometrical shapes of the individually addressable pixel-electrodes 214-$n$ (n=1,2,3, ..., N) are conceivable.

Figure 4A:
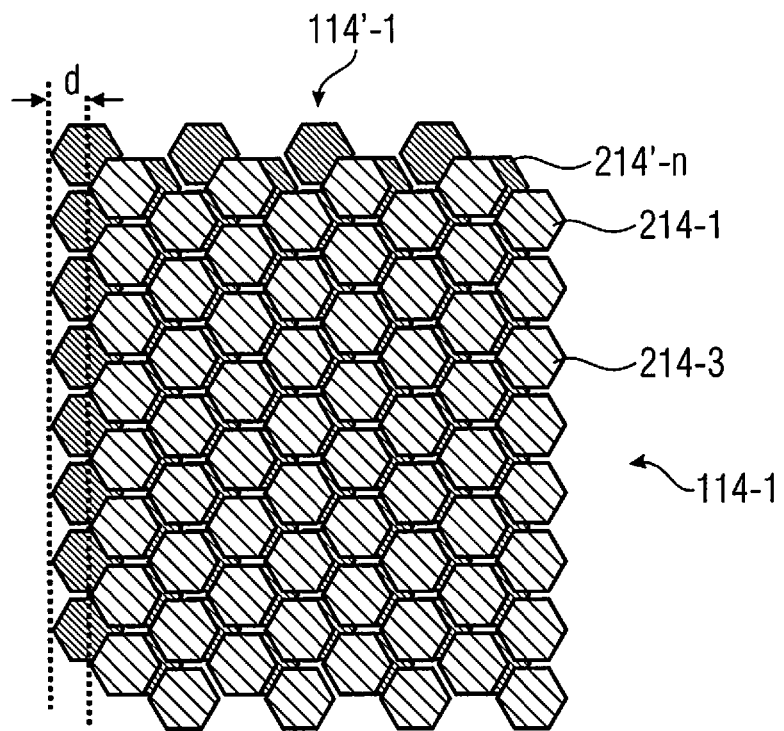
FIG. 4a shows a top view section of the planar electrode structure patterned in arrays of identically shaped pixel electrodes, wherein two parallel electrode layers are superimposed on each other.

To further minimize the effect of electric field inhomogeneities in the electro-optic core layer 112, multiple parallel pixel-electrode layers may be superimposed on each other in the design of an inventive optical waveguide device. I.e., either on one side or on both sides of the electro-optic core layer 112 the electrode arrangement may comprise a plurality of stacked and laterally shifted electrode layers in proximity and in parallel to the electro-optic core layer 112. This is shown exemplarily in FIGS. 4a, b.

According to embodiments of the present invention, the electrode arrangement comprises, arranged in proximity (i.e., in a distance to the electro-optic core layer 112 of approximately $10^{-7}$ m to $10^{-4}$ m) and on the same side of the electro-optic core layer 112 as the first electrode layer 114-1, a further electrode layer 114'-1 in parallel to the first electrode layer 114-1, wherein the further electrode layer 114'-1 comprises an array of individually addressable further pixel-electrodes 214'-$n$ ($n=1,2,3,\ldots,$ N) arranged such that a position of a further pixel-electrode 214'-$n$ laterally intermediates positions of two neighboring pixel-electrodes 214-($n$-1), 214-$n$ ($n=1,2,3,\ldots,$ N) of the first electrode layer 114-1, in order to minimize electrical field discontinuities or inhomogeneities due to lateral pixel-electrode separation. Thereby, the stacked electrode layers 114-1 and 114'-1 are laterally shifted by a distance d, which is a fraction of a diameter of a pixel-electrode 214-$n$. In particular, d may be in the range of half a diameter of a pixel-electrode if there are two stacked electrode layers 114-1 and 114'-1. In general, d may be inversely proportional to the amount of parallel stacked electrode layers.

Figure 4B:
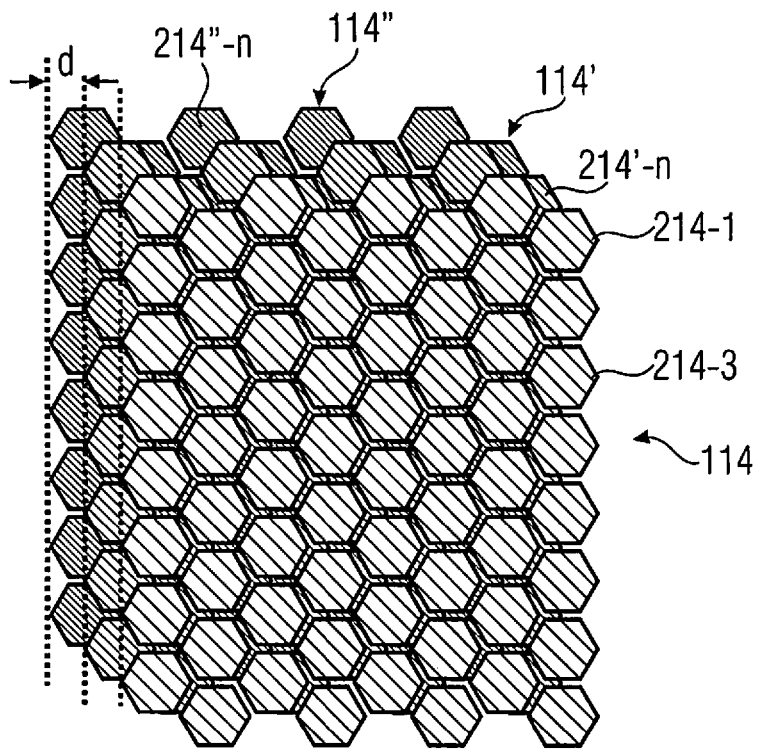
FIG. 4b shows a top view section of the planar electrode structure patterned in arrays of identically shaped pixel electrodes, wherein three parallel electrode layers are superimposed on each other.

Of course, also more than two parallel and laterally shifted electrode layers may be stacked on top of each other either on one or on both sides of the electro-optic core layer 112. This is illustrated in FIG. 4b, where three parallel hexagonal pixel-electrode layers 114, 114' and 114" are exemplarily illustrated. The electrode layers 114, 114' and 114" are shifted in such a way as to assure a maximum surface coverage on a xy-plane projection.

The electro-optic core layer 112 may be made of an electro-optic material, such as various inorganic or organic materials. Any inorganic material, such as nonlinear crystals (lithium niobate), gallium arsenide, oxides, such as $TiO_2$, and ceramics PLZT, PMN-PT or any mixture of organic/inorganic/ceramics or ceramic composites may be used. Alternatively, the core layer may be made from electro-optic organic materials or nonlinear optical Kerr materials from the class of polymers, copolymers, cross-linked polymers, host-guest systems, organically modified sol-gels, liquid crystals, liquid crystals dispersed in polymer matrices, silicon based polymers and self-assembly with previously mentioned materials. Suitable Kerr effect media for use with the invented embodiments, especially when fast devices (>10 GHz) should be concerned, are blends comprising a chromophore attached at a side chain of a polymer, wherein the chromophore has high nonlinear optical response respectively β-hyperpolarizability. Examples of chromophores in polymer matrices are e.g. 4N,N'-dimethylamino-4'nitrostilbene/poly-methylmethacrylate (DANS/PMMA), Disperse Red 1/poly-methylmethacrylate (DR1/PMMA), Disperse Red 1/Polyurethane (DR1/PUR), with DR1 being from the class of disperse red chromophores. The core layer 112 and the cladding layers 202 may be made from the same material with different doping characteristics, implants and implantation profiles, poling degrees, cross-linking degrees, etc., or may be made from different materials. In general, the cladding layers 202 may be made of passive materials or electro-optic materials which are known to the skilled person.

The electro-optic core layer 112 and/or the cladding layers 202 may be fabricated by known methods, such as spin-coating, dip-coating, printing or brushing and placed on the electrode layer(s) 114. In some cases, for instance, in the case of chromophores, a special poling process is needed after spin-coating to induce the microscopic polarization of the initial randomly oriented dipoles needed to activate the Pockels effect in the polymer film. Thereby, a chromophore denotes a region in a molecule where an energy difference between two different molecular orbitals falls within the range of the visible spectrum. Poling of the electro-optic waveguide layer 112 in the layer sandwich 110 may be realized by methods known by those skilled in the art, such as corona poling, electrode beam poling, ion beam poling, etc. The result is, e.g., an increase of electro-optic coefficients, which in turn will favor a waveguide single mode operation at lower voltage or a lower half-wave voltage for the operation of an electro-optic waveguide modulator.

The refractive index $n_0$ for the used materials of the electro-optic core layer 112 may range from 1.4 to 2.8. A refractive index $n_0$ means that in the specific material light travels at $1/n_0$ of the speed of light $c_0$ in a vacuum. In order to increase an optical mode confinement, mode selection is advantageous. For instance, in a step index waveguide based on electro-optic active materials, a voltage $U_I$ to be applied on the electro-optic waveguide (i.e. the individual electrodes 214) for a first oscillation mode to occur in the electro-optic core layer 112 is given by the following simplified formula:

$$U_I \approx \frac{d}{n_0^4 \cdot k_0^2 \cdot b^2 \cdot r}, \tag{3}$$

where $n_0$ is the refractive index, $k_0$ ($=2\pi/\lambda$) is the wave number with $\lambda$ being the wavelength of light propagating through the waveguide, r is the relevant electro-optic coefficient b denotes the waveguide-width and d the thickness. Taking, e.g., as typical values for electro-optic polymer waveguides $n_0=1.5$, $\lambda=600$ nm, r=40 pm/V, d=10 μm and b=10 μm, the resulting voltage $U_I$ to be applied to the electro-optic waveguide for a first oscillation mode is approximately 5 V.

Analogously, for Kerr active materials, a voltage $U_{II}$ to be applied to an electro-optic waveguide for the first mode oscillation in a step index waveguide is given by the simplified formula:

$$U_{II} \approx \frac{d}{(K\lambda)^{1/2} n_0^{1/2} \cdot b \cdot k_0}, \tag{4}$$

wherein K is the Kerr coefficient of the relevant electro-optic material. Taking, e.g., as typical values for opto-ceramics waveguides $n_0=2.5$, $K\lambda=10^{-16}$ m$^2$/V$^2$, the calculated voltage $U_{II}$ for the first mode oscillation will be again approximately 6 V.

Also, in addition to the upper or lower cladding layer 202-1, 202-2, a further cladding layer 202'-1 and/or 202'-2 may be added as an outermost cladding layer, respectively, in between the electrode layer 114-1 or 114-2 and the cladding layer 202-1 or 202-2, the further cladding layer 202'-1 and/or 202'-2 having a refractive index lower than the first cladding layer 202-1 and/or the second cladding layer 202-2 to keep the optical mode from contacting the electrode layers 114-1 and/or 114-2 and thereby generating extra optical losses.

Figure 5:
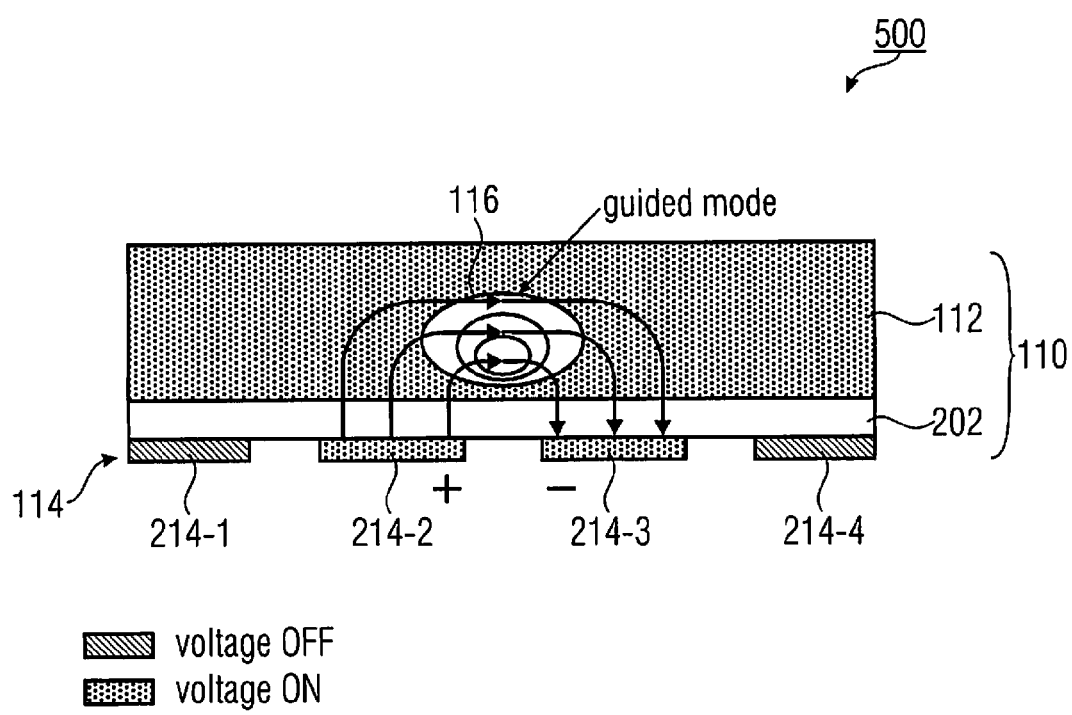
FIG. 5 shows a cross-sectional view of a variable electro-optic waveguide device with a single electrode layer, a cladding layer and an electro-optic core layer, according to an embodiment of the present invention.

Now that the inventive concept of variably guiding optical waves by means of activating the electro-optic effect by the plurality of electrodes 214 has been described, various exemplary embodiments of the present invention shall be highlighted in more detail. With reference to FIG. 5, an optical waveguide device 500 comprising an electrode arrangement with only one electrode layer 114 in proximity to the electro-optic core layer 112 shall be explained.

The optical waveguide device 500 comprises a layer stack 110 of an electrode layer 114 comprising a plurality of individually addressable pixel-electrodes 214-$n$ ($n=1,2,3,4$). On top of the electrode layer 114 there is arranged a buffer layer or cladding layer 202. Further, on top of the cladding layer 202 there is arranged an electro-optic core layer 112 for variably guiding light. The electrode layer 114 consists of a plurality of identical planar arranged pixel-electrodes 214-$n$, each being individually addressable via an electronic substrate (not shown). Applying an electric potential difference between selected adjacent pixel-electrodes on desired pathways (FIG. 5 exemplarily shows electrodes 214-2, 214-3), causes, in turn, in a region 116 of the electro-optic core layer 112, a local variation of the refractive index of the electro-optic core layer 112. This is due to a penetration of the region 116 of the electro-optic core layer 112 by the generated electric field. As a result, a light wave may be guided in the activated region 116 of the electro-optic core layer 112 of the optical waveguide device 500 along a pathway defined by electric potential differences applied between the selected adjacent pixel-electrodes of the single electrode layer 114.

Figure 6:
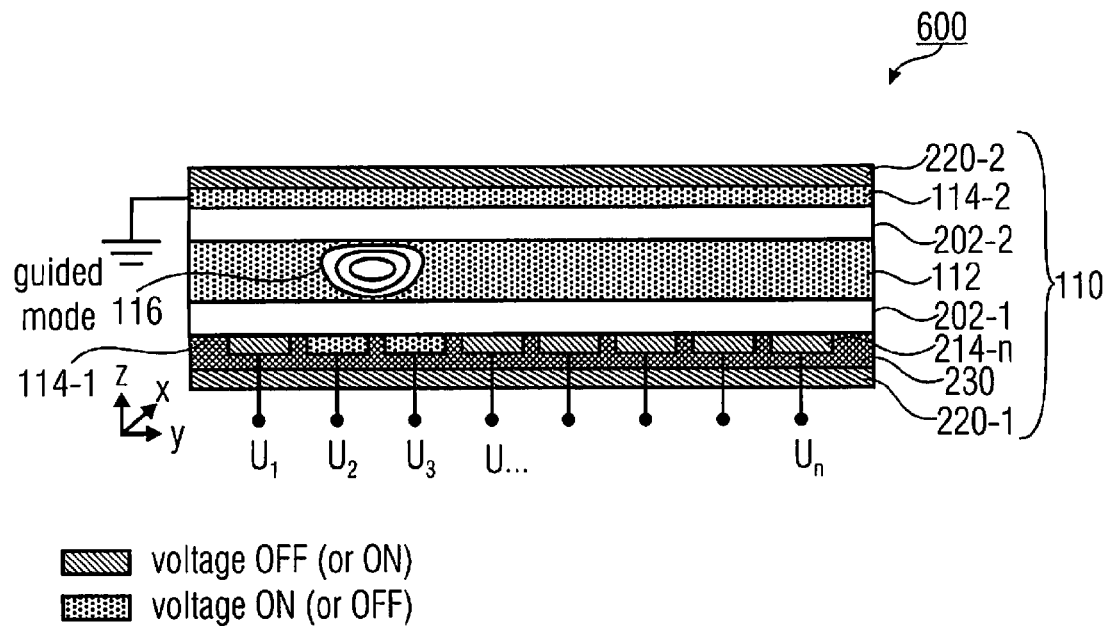
FIG. 6 shows a cross-sectional view of a variable optical waveguide device with an electrode layer comprising planar arranged pixel electrodes on a substrate.

A further embodiment of an optical waveguide device 600 is schematically depicted in the cross-section of FIG. 6.

The optical waveguide device 600 comprises a lower electrode layer 114-1, the lower electrode layer 114-1 comprising a plurality of identical planar arranged electrodes 214-$n$ placed on a silicon or glass substrate/wafer 220-1 and an insulating layer 230-1. The pixel-electrodes 214-$n$ may be contacted to predefined electric potentials $U_n$. The electric potentials $U_n$ may be set independently for each of the pixel-electrodes 214-$n$ of the lower electrode layer 114-1. On top of the lower electrode layer 114-1 there is arranged a multi-layer stack comprising an electro-optic core layer 112 embedded in between lower and upper cladding layers 201-1, 202-2. An upper electrode layer 114-2 placed on top of the upper cladding layer 202-2 comprises a conductive layer as ground electrode. On top of the upper electrode layer 114-2 there is provided an upper substrate 220-2 of glass or silicon.

The conductive parts of the electrode layers 114-1, 114-2, i.e., e.g., the pixel electrodes 214-$n$, may be made from aluminum, ITO, conductive polymers, etc. The lower cladding layer 202-1 may be made from an organic or inorganic material or composite, the core layer 112 may be fabricated from an electro-optic material and the upper cladding layer 202-2 may also be made from an organic or inorganic material, blend or composite. The multi-layer stack comprising the electro-optic core layer 112 embedded in between the lower and the upper cladding layer 201-1, 202-2 is sandwiched between the electrode layers 114-1 and 114-2. Applying non-zero electrical potential differences between individually addressable pixel-electrodes 214-$n$ of the lower electrode layer 114-1 corresponding to desired light propagation pathways causes, in response to respective resulting electric fields between selected pixel electrodes of the lower electrode layer 114-1, a local variation of the refractive index of the electro-optic core layer 112, respectively. A light-wave may be guided in the electro-optic core layer 112 of the device 600 along this activated pathway. Alternatively, non-zero electrical potential differences may also be applied between individually addressable pixel-electrodes 214-$n$ of the lower electrode layer 114-1 and the opposite upper electrode layer 114-2 in order to generate electrical fields penetrating the electro-optic core layer 112.

Figure 7:
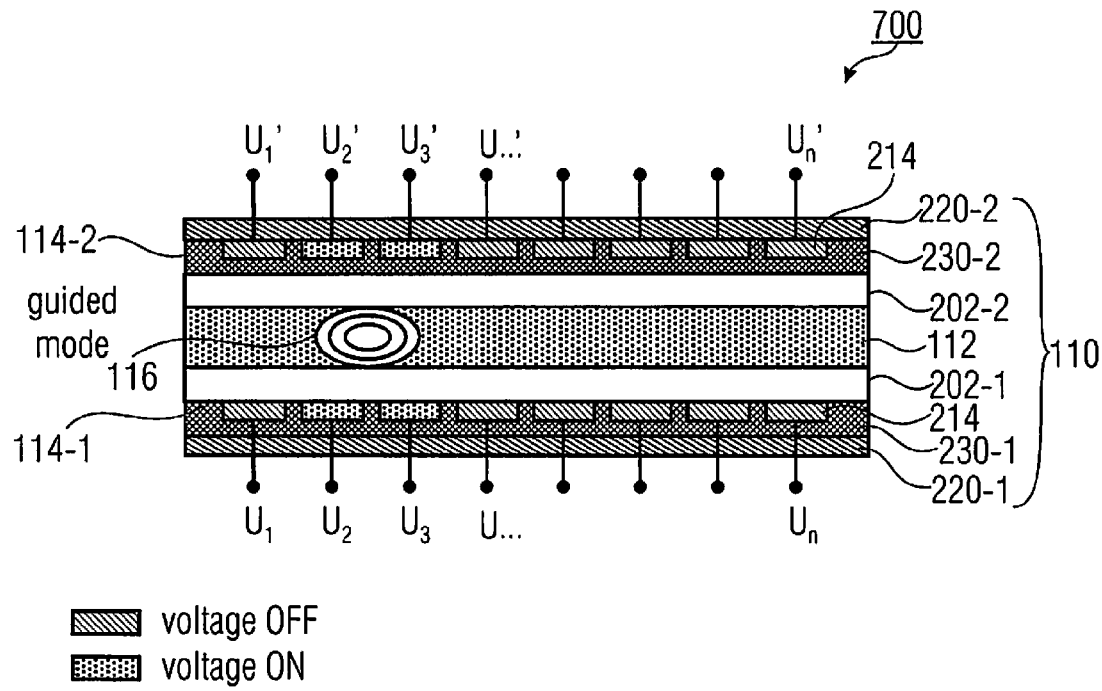
FIG. 7 shows a cross-sectional view of the variable optical waveguide device with a pixelized lower electrode planar structure on a substrate, cladding layers, the electro-optic core layer and a pixelized top electrode planar structure on a substrate.

A further embodiment of the present invention is exemplarily depicted in the cross-section of FIG. 7.

The optical waveguide device 700 of FIG. 7 differs from the optical waveguide device 600 by the implementation of the upper electrode layer 114-2. Wherein the upper electrode layer 114-2 shown in FIG. 6 merely comprises a single electrode realized by means of a conductive layer, the upper electrode layer 114-2 of the optical waveguide device 700 comprises, similar to the lower electrode layer 114-1, a plurality of planar arranged and individually addressable pixel-electrodes 214-$n$ placed on an upper silicon or glass substrate/wafer 220-2 and an insulating layer 230-2. The individual pixel-electrodes 214-$n$ may be connected to electrical potentials $U_n'$, wherein the electrical potentials $U_n'$ may be set independently from each other in order to drive the individual pixel-electrodes 214-$n$ of the upper electrode layer 114-2. Both the individual pixel-electrodes of the lower and upper electrode layer 114-1, 114-2 may be individually programmed to activate a desired optical path configuration. The pixel-electrodes of the upper electrode layer 114-2 are advantageously arranged symmetrically about a vertical axis with respect to the pixel-electrodes of the lower electrode layer 114-1 on the opposite side of the electro-optic core layer 112. I.e. the pixel-electrodes of the upper electrode layer 114-2 are arranged symmetrically to the pixel-electrodes of the lower electrode layer 114-1 with respect to the electro-optic core layer 112 as symmetry plane. Applying non-zero potential differences between adjacent lower or upper pixel-electrodes or, applying potential differences between corresponding opposite lower and upper pixel-electrodes, wherein the selected pixel-electrodes correspond to desired optical pathways, causes a related local variation of the refractive index of the electro-optic core layer 112. This has already been explained before. A light wave may be guided in the core layer 112 of the device 700 along this pathway 116. The difference compared to the embodiment according to FIG. 6 is that the activated region or the guided mode intensity profile 116 is in this case symmetrical with respect to the xy-plane, i.e. the plane of the electro-optic core layer 112. Thus, the mode confinement along the propagation direction may be improved and propagation losses due to this effect may be minimized.

Figure 8A:
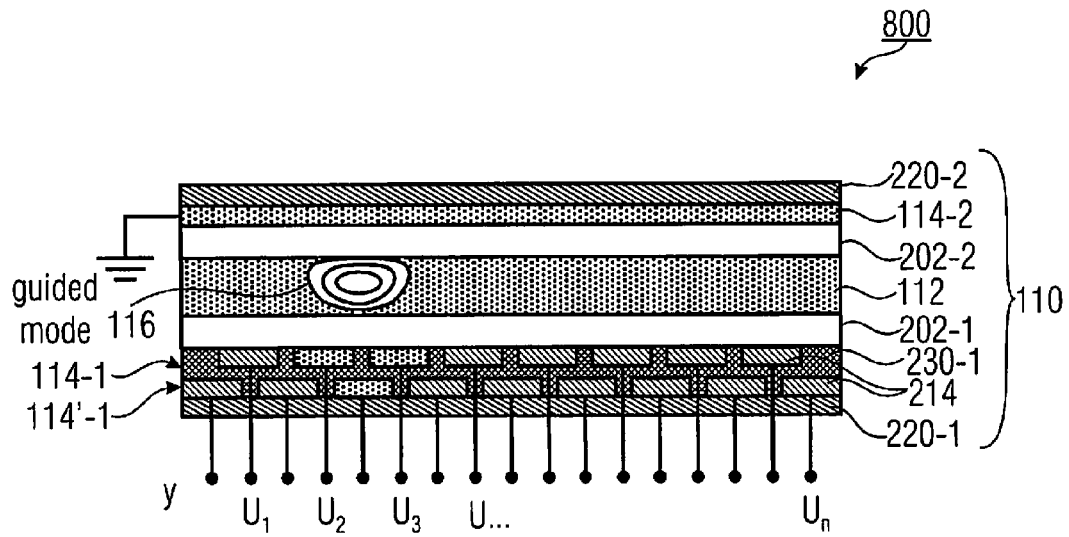
FIG. 8a shows a cross-sectional view of an optical waveguide device having two laterally shifted electrode layers underneath the electro-optic core layer.

A further embodiment depicted in FIG. 8$a$ illustrates an optical waveguide device 800 with similar parts compared to the embodiment of the optical waveguide device 600, however, with the exception that the electrode arrangement comprises two lower vertically stacked and laterally shifted electrode layers 114-1 and 114'-1. Such a configuration has already been explained with reference to FIGS. 4$a$, 4$b$. I.e., the electrode arrangement formed on the silicon wafer 220-1 comprises two vertically stacked and laterally shifted electrode layers or planes 114-1, 114'-1, each with a plurality of identical planar arranged pixel-electrodes 214-$n$, 214'-$n$ on a substrate 220-1. The pixel-electrode layers 114-1, 114'-1 are superimposed on each other in parallel and laterally shifted in such a way as to assure a maximum surface coverage on an xy-plane projection. This is to minimize an effect of electrical field inhomogeneities due to discontinuities in the pixel-electrodes design, which would give rise to extra losses in the optical mode in the proximity to the pixel-electrodes. The individually addressable pixel-electrodes from the two separate, vertically stacked and horizontally shifted electrode layers 114-1 and 114'-1 are connected to separate voltages, respectively. When applying non-zero potential differences between selected adjacent lower pixel-electrodes or applying non-zero potential differences between the lower pixel-electrodes 214-$n$, 214'-$n$ and the upper electrode layer 114-2, the selected pixel-electrodes corresponding to a desired optical pathway 116 effect a change of the refractive index in the pathway 116 of the electro-optic core layer 112 in response to an electric field generated by means of the individually addressed and/or driven electrodes, such that a propagation of light may be manipulated along the region 116.

Figure 8B:
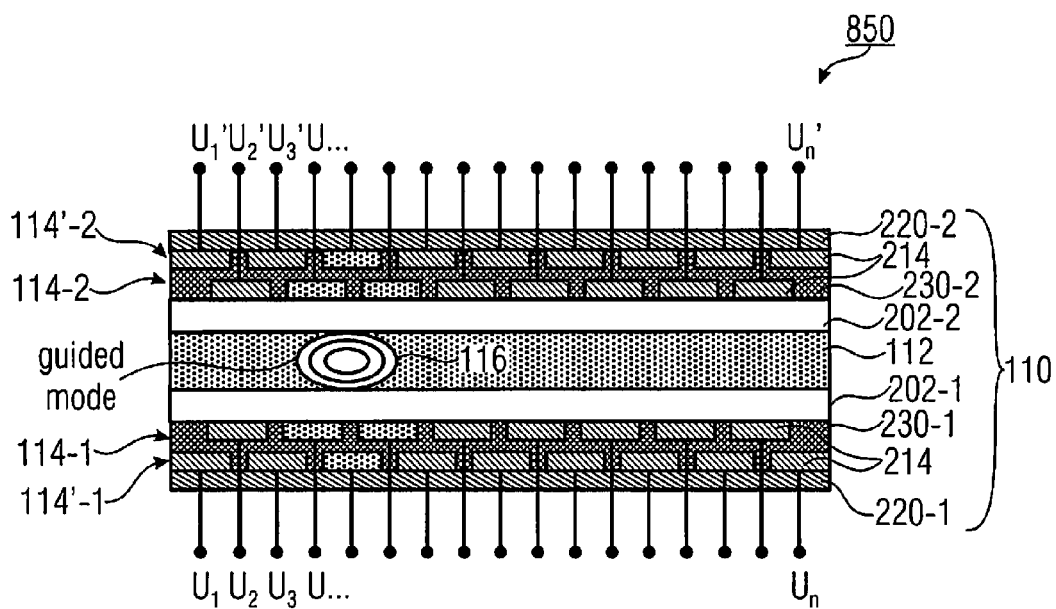
FIG. 8b shows an optical waveguide device having two laterally shifted electrode layers underneath and above the electro-optic core layer, respectively.

FIG. 8b illustrates a cross-sectional view of an embodiment of an optical waveguide 850, which is similar to the optical waveguide 700 which has been explained referring to FIG. 7, however, with the exception that the lower electrode structure comprises two lower electrode layers or planes 114-1, 114'-1, each with a plurality of identical planar pixel-electrodes formed on a substrate 220-1. The pixel-electrodes from the two separate electrode layers 114-1, 114'-1 below the electro-optic core layer 112 are connected to separate electric potentials or voltages $U_n$, wherein the electric potentials $U_n$ or the corresponding lower pixel electrodes are individually addressable. This is again to minimize the effect of electric field inhomogeneities due to the discontinuities in the electrode design, which would rise to extra losses of the optical mode in the proximity of the electrodes. The upper electrode structure above the electro-optic core layer 112 also comprises two vertically stacked and laterally shifted planes or layers 114-2, 114'-2 of pixel electrodes, similar to the lower electrode structure. The individual pixel-electrodes from the two separate upper electrode layers 114-2, 114'-2 may also be connected to separate voltages $U_n'$, respectively, wherein the individual upper pixel-electrodes are individually addressable in order to apply an individual electric potential $U_n'$ to the addressed pixel-electrode. Advantageously, the pixel-electrodes of the upper electrode structure are arranged symmetrically to the pixel-electrodes of the lower electrode structure with respect to a plane defined by the electro-optic core layer 112.

Figure 9:
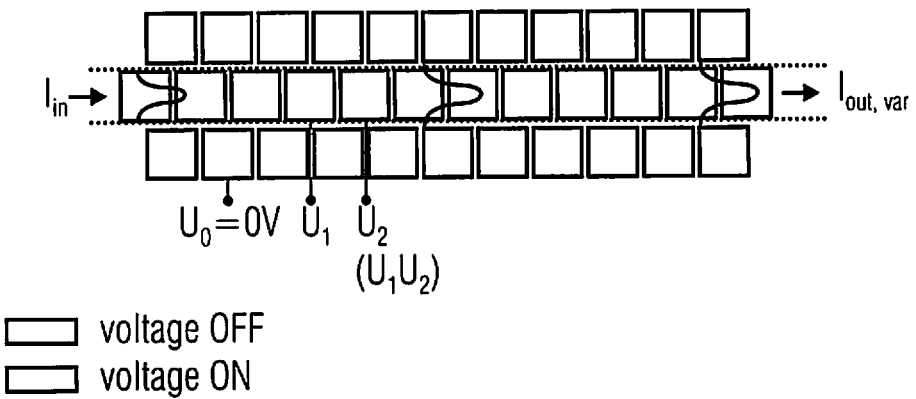
FIG. 9 illustrates an array of pixel electrodes set at variable voltages as an example to modulate an electrical field resulting in turn in a modulation of optical intensity variation, according to an embodiment of the present invention.

Variable optical waveguide device model designs according to embodiments of the present invention may replace various planar waveguide based devices by adequate activation of the individually addressable pixel-electrodes 214. FIG. 9 exemplarily illustrates a top view of an array of adjacent pixel-electrodes set at different voltages $U_0=0V$ and $U_1$, $U_2$ ($U_1 \neq U_2$) as an example of how to modulate an electrical field generated by means of an inventive variable optical waveguide device. The electrical field modulation via the different applied voltages will induce in turn an optical intensity variation of an input intensity $I_{in}$ to an output intensity $I_{out,var}$ in the coupled optical mode. I.e., according to embodiments, the electrode arrangement is configured to generate different electric field intensities in different parts of the electro-optic core layer 112, so that to obtain different activated electro-optic effect intensities in the different parts of the electro-optic core layer 112. As a result, a variable optical attenuator may be realized according to the principle explained with reference to FIG. 9.

Figure 10:
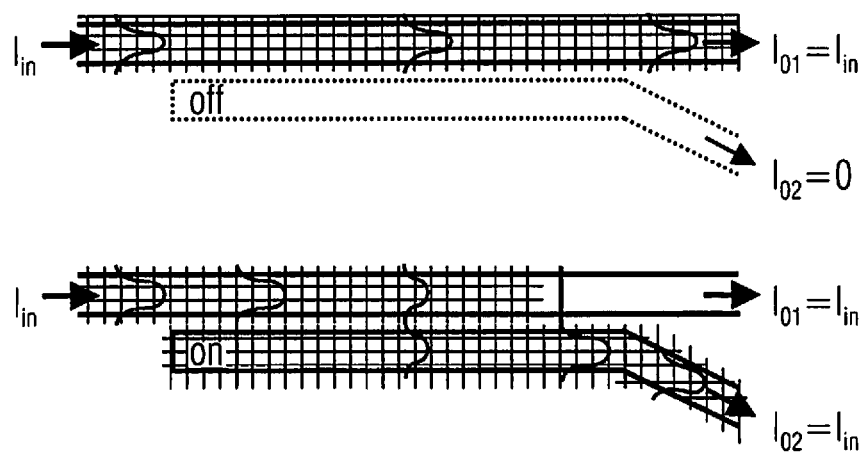
FIG. 10 illustrates a concept of a realization of an optical switch with an optical waveguide device according to an embodiment of the present invention.

FIGS. 10a and 10b illustrate a principle of realizing an optical directional coupler with embodiments of the present invention. According to FIG. 10a, a light wave having an input intensity $I_{in}$ at an input of the directional coupler is propagating on a straight route to an output of an optical waveguide device according to embodiments, whose active electrical configuration comprises a straight array of pixel electrodes at non-zero voltages corresponding to the straight route. As it is illustrated in FIG. 10b, the input light wave will couple, due to mode interference, to another parallel route when this other route, i.e., the corresponding pixel-electrodes, are activated. This concept may be used in the design of any device which needs a bending waveguide, such as in a Y-branch interferometer, beam steerers, etc.

Pixelized electrodes or electrode layers 114 with individual pixel-electrodes 214 as in an inventive optical waveguide device may also be combined with other non-pixelized electrode structures for active waveguides and/or structured waveguides. In this case, various combinations of active and passive devices may be designed to create various functions such as multiplexers, demultiplexers, interconnectors, multiple modulators or for facilitating light coupling in a variable optical waveguide device.

Figure 11A:
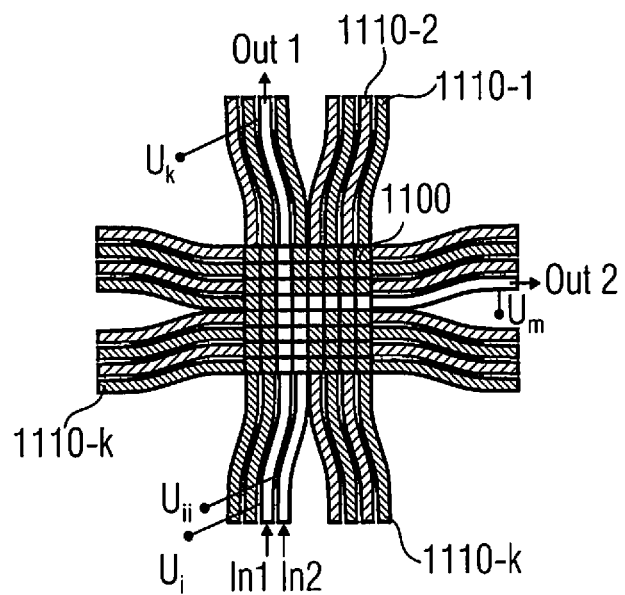
FIG. 11a,b show a combination of an optical waveguide device with preset electrodes.

FIG. 11a displays an inventive variable optical waveguide device 1100 with active, individually addressable pixel-electrodes 214 in combination with external predetermined optical pathways 1110-k (k=1, 2, ..., K). The variable optical waveguide device 1100 therefore allows for flexible light routing between the connected external predetermined optical pathways 1110-k (k=1, 2, ..., K), which may, e.g., be defined by conventional optical fibers. Alternatively, the external predetermined optical pathways 1110-k could also be defined in the electro-optic core layer 112 by corresponding fixed or predetermined electrodes, which may have predetermined geometries therefore providing the predetermined electrical/optical pathways 1110-k, as opposed to the variable pixelized surfaces of the variable optical waveguide device 1100 which will provide variable electrical/optical pathways. In FIG. 11a, one one-dimensional pixel-electrode array is used per external optical pathway 1110-k, wherein the variable optical waveguide device 1150 of FIG. 11b uses a plurality of one-dimensional pixel arrays per external optical pathway 1110-k. In FIG. 11a light coming from optical pathway In1 is routed via the optical waveguide device 1100 to an optical pathway output port Out1. Light coming from optical pathway input In2 is routed towards optical pathway output Out2 either via a direct routing of a deflected wave or by a coupling method according to FIG. 10 by means of the inventive variable optical waveguide device 1100.

Figure 11B:
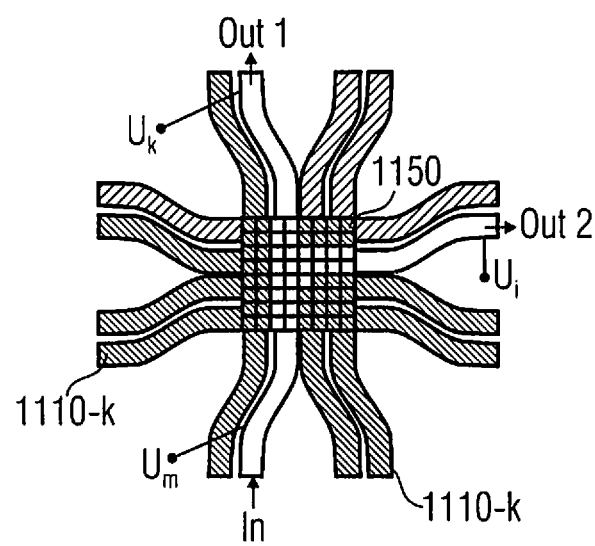

In case of FIG. 11b, light coming from the optical pathway input In is routed to both optical pathway output ports Out1 and Out2, i.e., the light is split between Out1 and Out2 by means of the inventive optical waveguide device 1150. Light coupling into inventive variable optical waveguide devices may e.g. be realized by means of tapered fibers, micro-lenses, prisms or holographic gratings.

Referring now to FIGS. 12a to 12c, an optical deflection of light waves by means of the inventive concept will be explained.

By varying the refractive index in a direction transversal to the optical wave pathway, a deflection angle as large as 90° may be designed with minimal optical losses. In FIG. 12a, a waveguide segment 1200 of width b and radius $\rho_0$ is sketched. By varying the voltage of pixel-electrodes across the waveguide-width b from $U_0$ to $U_{max}$, the resulting refractive index variation across the waveguide-width b is (approximately) linear. With the condition that the waveguide-width b is larger than or approximately equal to the waveguide thickness, the refractive index variation may be given by the following approximation:

$$\Delta n \approx \frac{b}{n_0 \rho_0}, \tag{5}$$

wherein b denotes the waveguide-width and $\rho_0$ denotes the waveguide inner radius of curvature. The radius of curvature of a waveguide made of a linear electro-optic material (Pockels effect) may thus be approximated by:

$$\rho_0 \approx \frac{bd}{U_{max}} \cdot \frac{2}{n_0^4 r}, \tag{6}$$

and for a Kerr-material by:

$$\rho \approx \frac{bd^2}{U_{max}^2} \cdot \frac{2}{n_0^4 R}. \tag{7}$$

From Eq. (7) it follows that, e.g., for a Kerr material with $R=10^{-16}$ m²/V², a refractive index $n_0=2.5$, an electro-optic core width b=25 μm, a core thickness d=25 μm and a voltage varying approximately linear across the core from $U_0=0$ to $U_{max}=100V$, the radius $\rho_0$ of curvature of the waveguide is about 800 µm.

This voltage variation from $U_0$ to $U_{max}$ may be realized with the help of an inventive optical waveguide device as is illustrated by FIG. 12b. The realization of the waveguide segment 1210 depicted on the left-hand side of FIG. 12b may be achieved with a voltage variation of corresponding pixel-electrodes of electrode layers as detailed on the right-hand side of FIG. 12b. In this way, it is possible to design planar, two-dimensional variable optical waveguide devices with small radii, large deflection angles, such as, e.g., micro-ring resonators. FIG. 12b displays a section from a top view of a hexagonal pixel-electrode structure. The segment 1210 from a micro-ring resonator is produced by applying variable voltages to the pixel-electrodes 214 in transversal direction to the optical waveguide pathway, provided that the pixel-electrodes 214 or the corresponding pixels are sufficiently small. I.e., the electrode arrangement, respectively a voltage addressing driver, may be configured to generate a rising, falling or constant electric field intensity in the electro-optic core layer 112, such that, in response to the rising, falling or constant electric field intensity, a refractive index of the electro-optic material is varied to guide and/or route and/or modulate light propagation in different directions. In particular, the electrode arrangement (together with the related voltage addressing driver) may be configured to generate a rising or falling electric field intensity in the electro-optic core layer 112 perpendicular to a light propagation direction, such that, in response to the rising or falling electric field intensity, a refractive index of the electro-optic material is varied perpendicular to the light propagation direction for deflecting propagating light.

I.e., the electrode arrangement of an optical waveguide device according to embodiments may be configured to generate variable electric fields intensities in distinct parts of the electro-optic core layer 112 such that a refractive index of the electro-optic material in the distinct parts may be varied to permit a coupled light wave to be guided, routed and/or modulated in different directions with a respective characteristic function of a beam deflector, a beam steerer, an optical switch, an interconnector, an optical router, a beam splitter, an intensity modulator, a power attenuator, a Y-Branch interferometer, a Mach-Zehnder interferometer, a directional couplers, a micro-ring resonator, a variable optical attenuator or a polarization controller.

Figure 13:
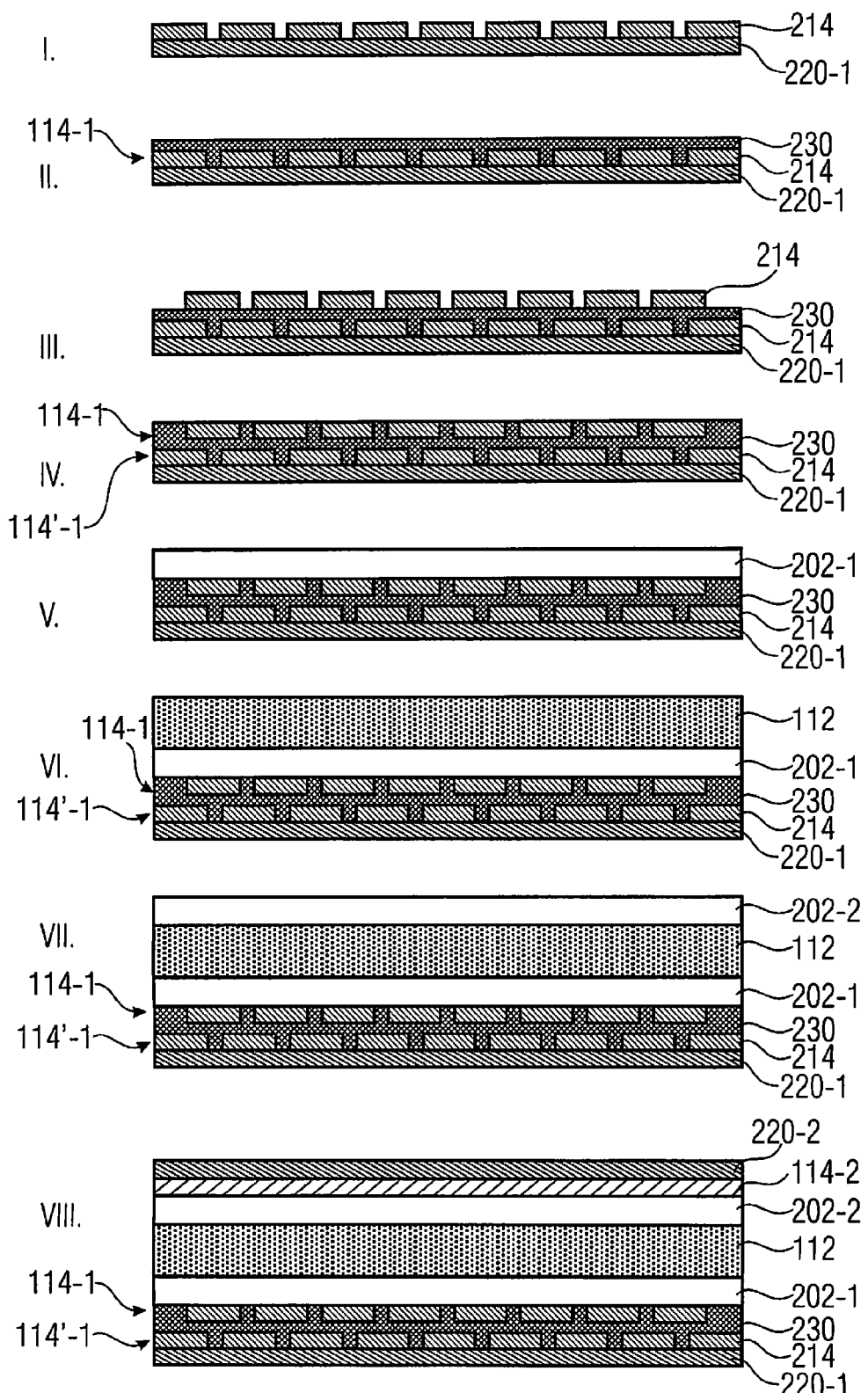
FIG. 13 shows a fabrication process flow for obtaining an optical waveguide device according to an embodiment of the present invention.

Referring now to FIG. 13, a fabrication process of an optical waveguide device according to an embodiment of the present invention shall be highlighted.

In a first step I, a plurality of planar arranged pixel-electrodes 214 is structured in a conductive layer on a carrier or substrate 220-1, which may be a glass or silicon substrate. In a second fabrication step II, an insulating layer 230, e. g. an oxide, is deposited on the plurality of pixel-electrodes 214 and planarized, e. g. by chemical-mechanical planarization or chemical-mechanical polishing, commonly abbreviated CMP, which is a technique conventionally used in semiconductor fabrication for planarizing a semiconductor wafer or another substrate. In a third (optional) step III, a further electrode layer 114'-1, in parallel to the first electrode layer 114-1 and comprising an array of individual further pixel-electrodes 214' and planarized in a similar way like the pixel-electrodes 214, is fabricated on the planarized insulating layer 230. In a fourth (optional) fabrication step IV, further insulating material is deposited on the insulating layer 230 in order to isolate the further pixel-electrodes 214' from each other. In a fifth step V, a first (lower) buffer layer or cladding layer 202-1 is applied onto the two electrode layers 114-1, 114'-1, e.g. by spin coating, which is a procedure to apply uniform thin films to flat substrates. After that, in step VI, the electro-optic core layer 112 is deposited, e. g. by spin-coating, on the first cladding layer 202-1. In a subsequent step VII, a second (upper) cladding layer 202-2 is deposited, e.g. by spin-coating, on the core layer 112. Finally, in step VIII, the upper electrode 114-2 layer may be designed and fabricated by e.g. spin coating as in any of the previously described examples or bonding a wafer comprising the upper electrode 114-2 layer. If needed, the resulting waveguide multilayer should be poled by any known means.

The pixel-electrode fabrication steps may be realized by patterning using standard silicon process technology. Contacting the pixel-electrodes 214 to electronic circuits may be realized either by lateral metal lanes contacting each pixel in the electrode layer or by through-wafer interconnects. For addressing individual pixel-electrodes 214 one could also use a SRAM-like address circuit configuration, i.e., each pixel-electrode 214 corresponds to the one cell of the SRAM. By making use of silicon fabrication methods, several optical waveguide devices according to embodiments of the present invention may be fabricated in parallel on one wafer allowing a cost-effective production.

To summarize, some embodiments of the present invention relate to a waveguide device consisting of at least one electro-optic layer sandwiched between lower and upper substrates containing electrodes. For a waveguide device according to embodiments at least one lower or one upper electrode are patterned such that at least one array of a plurality of individual electrodes is generated. Thereby arrays of individual electrodes are arranged in at least one planar matrix in a substrate. Planar matrices of individual electrodes are parallel, superimposed on each other in a substrate, such that any field discontinuities due to electrodes separation are at least minimized. Said individual electrodes have geometrical shapes such as squared, circular, hexagonal, octagonal, triangular, lens-like or any other variety of shapes. According to some embodiments, matrices of individual electrodes in a substrate are shifted on each other in such a way as to assure the maximum surface overage on projection plane parallel to the substrate. At least one individual electrode from a lower substrate and at least one individual electrode from an upper substrate are placed on each other at user-defined positions. Either the upper or the lower substrate containing electrodes may be missing. The remaining electrode may be patterned such that an array of a plurality of individual electrodes is generated. In order to generate an electric field, at least two adjacent individual electrodes from one substrate are set at different electrical potentials. According to some embodiments, either the upper or the lower substrate may contain only one electrode layer. At least one individual electrode from a lower substrate and one individual electrode from an upper substrate may be electrically addressed. Also, all individual electrodes from a lower substrate and all individual electrodes from an upper substrate may be electrically addressed. Thereby, the individual electrodes contained in any lower and any upper substrates may be electrically addressed to selectively activate any possible electrical pathway configuration. The individual electrodes contained in the lower or upper substrates may either be operated in a digital mode or in an analogue mode. According to an embodiment, said electro-optic layer has at least one cladding layer adjacent to it. Thereby, cladding layers may be formed from the same or from different materials and an electro-optic layer, namely the core, may be formed from a material with a refractive index equal to or higher than the refractive index of the claddings. The core may be formed from electro-optic organic materials or nonlinear optical Kerr materials from the class of polymers, copolymers, cross-linked polymers, host-guest systems, such as nonlinear optical chromophores mixed in polymer matrices (DANS/PMMA, DR1/PMMA, DR1/PUR, with DR1 being from the class of disperse red chromophores), chromophores in side-chain polymers, wherein the chromophore has high nonlinear optical response respectively β-hyperpolarizability, organically modified sol-gels, liquid crystals, liquid crystals dispersed in polymer matrix, silicon based polymers and any other blends with polymers. According to other embodiments, the core may be formed from electro-optic inorganic materials and Kerr materials, such as nonlinear crystals (lithium niobate), gallium arsenide, oxides such as $TiO_2$, ceramics such as PLZT, PMN-PT or any mixture of organic/inorganic/ceramics or ceramic composites and any self-assembly materials with previously mentioned materials. The claddings may be formed from organic materials such as glass, polymers and copolymers, such as acrylics, UV cured polymers, cross-lined polymers, silicone elastomers, host-guest polymer or any other electro-optical materials of lower electro-optic coefficients than the core material, or same electro-optical material as the core, but poled in opposite direction. Also, said claddings may be formed from an inorganic material such as glass, oxides, nonlinear crystals, ceramics and any organic and/or inorganic blends and composites.

The individual electrodes from lower and upper substrate may be addressed to cause a local variation in the refractive index of the electro-optic core layer. The individual addressed electrodes from lower and upper substrate correspond to an electrical pathway configuration of the variable optical waveguide. Light coupling in and out of the device may be realized by known means of tapered fibers, micro-lenses, prisms or holographic gratings. The core and cladding layers may be structured to form passive waveguides. According to further embodiments, at least an optical waveguide pathway is used as beam deflector, optical switch, network hub and interconnector. Also, at least an optical waveguide pathway may be used as beam splitter, intensity modulator, power attenuator, Y-Branch, Mach-Zehnder interferometer, directional coupler, or micro-ring resonator. An optical waveguide pathway may be used to form a micro-ring resonator or may be used as a beam steerer, an optical router or an optical transponder. As it has been described, at least a part of an optical waveguide pathway may be used as a variable optical attenuator, lens, prism or grating. Also by employing suitable electric fields across the core layer optical waveguides may, in the context of guiding polarized light, be used for polarization controlling.

According to embodiments, either the upper or the lower substrate may contain preset electrodes pathways. At least one substrate may be partly a matrix containing individually addressable electrodes and partly fixed electrodes pathways.

A fabrication method of a waveguide device, according to embodiments, comprises forming an electro-optic layer in the proximity to at least a substrate containing a plurality of individually addressable electrodes. The electro-optic core layer may be made of an organic material, whereas the organic material may be deposited by any known means, such as spin-coating, dip-coating, brushing. At least a cladding layer may also be fabricated from an organic material, whereas the organic material may be deposited by any known means, such as spin-coating, dip-coating, brushing. As has been described before, the electro-optic core layer may also be an inorganic material or a blend or a composite from inorganic/organic/ceramic materials or nanomaterials. According to some embodiments the electro-optic layer is poled.

The individually addressable electrode structure may be formed on a silicon substrate, wherein the individual electrodes are formed by CMOS technology with individual electrodes planarization by CMP and Reflow. The electrodes may be addressable individually via a SRAM-like circuit or architecture.

An inventive planar active waveguide device may vary the electrical field across a waveguide active configuration made of the electro-optical core layer, which is placed close to/in between at least one cladding layer. The core and cladding layer(s) are made of organic, inorganic, composites or blended materials. At least one outermost electrode layer consists of a plurality of closely packed planar pixel-electrodes, which are individually addressable via an electronic substrate. Within the planar structure of the device, a variety of optical waveguide pathways can be activated by addressing corresponding electrical pathways in the pixel-electrodes planes.

An inventive variable planar optical waveguide device may replace a multitude of possible existent devices based on waveguides, such as: connectors, switches, power attenuators, beam steerers, directional couplers, intensity modulators, beam deflectors, ring resonators, Mach-Zehnder interferometers, gratings or lenses or any other planar optical waveguide based device with the additional advantage that the properties of optical basic elements can be actively tuned respectively adjusted.

Although some aspects of the present invention have been described in the context of a variable optical waveguide device apparatus, it is clear that these aspects also represent a description of a corresponding method for variably guiding optical waves, where a functional block or sub-device corresponds to a method step or a feature of a method step. Analogously, aspects described in the context of a method step also represent a description of a corresponding block or item or feature of a corresponding apparatus.

Hence, embodiments also provide a method for variably guiding, routing and modulating optical waves, the method comprising variably activating an electro-optic effect in a region 116 of an electro-optic core layer 112 of electro-optic material by an electric field variably generated by means of an electrode arrangement with at least a first electrode layer 114 in proximity to the electro-optic core layer 112, such that a propagation of the light is manipulated in the region of the variably activated electro-optic effect.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An optical waveguide device, comprising:
   a layer-stack comprising
      an electro-optic core layer of electro-optic material for guiding light; and
      an electrode arrangement with at least a first electrode layer in proximity to the electro-optic core layer, wherein the electrode arrangement is configured to activate an electro-optic effect in a region of the electro-optic core layer by an electric field generated by means of the electrode arrangement, such that a propagation of the light is manipulated in the region of the activated electro-optic effect, wherein the first electrode layer comprises a regular two-dimensional array of planar arranged and individually addressable first electrodes to activate the electro-optic effect in the region of the electro-optic core layer by an electric field generated by individually applying electric potentials to addressed first electrodes, and wherein the electrode arrangement comprises, arranged in proximity and on a same side of the electro-optic core layer as the first electrode layer, a further electrode layer in parallel to the first electrode layer, the further electrode layer comprising a plurality of individually addressable further electrodes, arranged such that a position of a further electrode laterally intermediates positions of two neighbouring first electrodes in order to minimize electrical field inhomogeneities due to lateral electrode separation, wherein the region, in which the electro-optic effect is activated, represents an optical pathway permitting propagation of light such that the shape of the optical pathway is determined by the pattern of addressed electrodes.

2. The optical waveguide device according to claim 1, wherein the electrode arrangement comprises, arranged in proximity and on an opposite side of the electro-optic core layer as the first electrode layer, a second electrode layer comprising at least one second electrode, such that the electro-optic core layer is arranged in between the first and the second electrode layer, and wherein the electro-optic effect is activated by electric potential differences of adjacent individually addressable first electrodes of the first electrode layer or by electric potential differences between opposite individually addressable electrodes of the first and second electrode layer.

3. The optical waveguide device according to claim 1, wherein individually addressable electrodes of the electrode arrangement comprise a squared, hexagonal, octagonal or lens-like geometrical shape.

4. The optical waveguide device according to claim 1, wherein the electro-optic material of the electro-optic core layer is configured to change its refractive index in response to the electric field generated by means of the electrode arrangement, such that activating the electro-optic effect in the region comprises changing the refractive index of the electro-optic material in the region.

5. The optical waveguide device according to claim 1, wherein the electro-optic material is chosen from the group of electro-optic organic materials, electro-optic inorganic materials, organic/inorganic nonlinear optical Kerr materials or Kerr materials.

6. The optical waveguide device according to claim 1, wherein the layer-stack comprises a first cladding layer in between the electro-optic core layer and the first electrode layer, wherein the first cladding layer is formed from a material comprising a refractive index being lower than a refractive index of the electro-optic core layer in a region in which the electro-optic effect is activated.

7. The optical waveguide device according to claim 6, wherein the layer-stack comprises a second cladding layer arranged on an opposite side of the electro-optic core layer compared to the first cladding layer, such that the electro-optic core layer is arranged in between the first and the second cladding layers, and wherein the second cladding layer is formed from a material comprising a refractive index being lower than a refractive index of the electro-optic core layer in a region in which the electro-optic effect is activated.

8. The optical waveguide device according to claim 7, wherein a material of the first and/or second cladding layer is chosen from the group of organic materials, inorganic materials, organic and/or inorganic blends.

9. The optical waveguide device according to claim 1, wherein the electrode arrangement is configured to generate different electric field intensities in different parts of the electro-optic core layer by applying different electric potentials to different electrodes of the electrode arrangement, such as to acquire different activated electro-optic effect intensities in the different parts of the electro-optic core layer.

10. The optical waveguide device according to claim 1, wherein the electrode arrangement is configured to generate a rising or falling electric field intensity in the electro-optic core layer perpendicular to a light propagation direction, such that, in response to the rising or falling electric field intensity, a refractive index of the electro-optic material is varied perpendicular to the light propagation direction for deflecting propagating light.

11. The optical waveguide device according to claim 1, comprising an address logic circuit for individually addressing an individually addressable electrode of the electrode arrangement in order to apply a configurable electrical potential to the individually addressed electrode.

12. The optical waveguide device according to claim 1, wherein at least the first electrode layer of the electrode arrangement is formed on a substrate fabricated by means of a CMOS technology and wherein at least one electrode of the at least the first electrode layer is individually addressable by means of an integrated CMOS circuit.

13. A method for variably guiding optical waves, the method comprising:
activating an electro-optic effect in a region of an electro-optic core layer of electro-optic material by an electric field generated by means of an electrode arrangement with at least a first electrode layer in proximity to the electro-optic core layer, such that a propagation of the light is manipulated in the region of the activated electro-optic effect, wherein the first electrode layer comprises a regular two-dimensional array of planar arranged and individually addressable first electrodes to activate the electro-optic effect in the region of the electro-optic core layer by an electric field generated by individually applying electric potentials to addressed first electrodes, and wherein the electrode arrangement comprises, arranged in proximity and on a same side of the electro-optic core layer as the first electrode layer, a further electrode layer in parallel to the first electrode layer, the, further electrode layer comprising a plurality of individually addressable further electrodes, arranged such that a position of a further electrode laterally intermediates positions of two neighbouring first electrodes in order to minimize electrical field inhomogeneities due to lateral electrode separation, wherein the region, in which the electro-optic effect is activated, represents an optical pathway permitting propagation of light such that the shape of the optical pathway is determined by the pattern of addressed electrodes.

* * * * *